(12) United States Patent
Nakano et al.

(10) Patent No.: US 10,344,935 B2
(45) Date of Patent: Jul. 9, 2019

(54) OPTICAL UNIT

(71) Applicant: Koito Manufacturing Co., Ltd., Tokyo (JP)

(72) Inventors: Ryo Nakano, Shizuoka (JP); Tetsuya Ishida, Shizuoka (JP)

(73) Assignee: Koito Maufacturing Co., Ltd., Tokyo (JP)

(*) Notice: Subject to any disclaimer, the term of this patent is extended or adjusted under 35 U.S.C. 154(b) by 0 days.

(21) Appl. No.: 15/874,179

(22) Filed: Jan. 18, 2018

(65) Prior Publication Data

US 2018/0209606 A1 Jul. 26, 2018

(30) Foreign Application Priority Data

Jan. 20, 2017 (JP) ................. 2017-008587

(51) Int. Cl.
| | |
|---|---|
| B60Q 1/068 | (2006.01) |
| F21W 102/13 | (2018.01) |
| F21S 41/32 | (2018.01) |
| F21S 41/33 | (2018.01) |
| F21S 41/675 | (2018.01) |
| F21S 41/16 | (2018.01) |
| F21S 41/20 | (2018.01) |
| F21S 41/25 | (2018.01) |
| F21S 41/148 | (2018.01) |
| F21S 45/47 | (2018.01) |
| G01D 5/14 | (2006.01) |

(52) U.S. Cl.
CPC .......... *F21S 41/675* (2018.01); *B60Q 1/0683* (2013.01); *F21S 41/148* (2018.01); *F21S 41/16* (2018.01); *F21S 41/25* (2018.01); *F21S 41/285* (2018.01); *F21S 41/321* (2018.01); *F21S 41/336* (2018.01); *F21S 45/47* (2018.01); *F21W 2102/13* (2018.01); *G01D 5/145* (2013.01)

(58) Field of Classification Search
None
See application file for complete search history.

(56) References Cited

U.S. PATENT DOCUMENTS

| 9,637,048 B2* | 5/2017 | Shibata .................. B60Q 1/143 |
| 2013/0038736 A1* | 2/2013 | Yamamura ............. B60Q 1/143 348/148 |
| 2017/0282786 A1* | 10/2017 | Toda ....................... F21S 41/00 |
| 2018/0112845 A1* | 4/2018 | Tanaka .................. F21S 41/255 |

FOREIGN PATENT DOCUMENTS

| JP | 2002-326535 A | 11/2002 |
| WO | 2016/104319 A1 | 6/2016 |

* cited by examiner

*Primary Examiner* — Ashok Patel
(74) *Attorney, Agent, or Firm* — Abelman, Frayne & Schwab

(57) ABSTRACT

An optical unit includes a rotary reflector configured to form a light distribution pattern by reflecting light emitted from a light source and scanning the reflected light, a motor as a rotation drive unit configured to rotate the rotary reflector, a magnet attached to a predetermined reference portion of the rotary reflector, and a Hall element configured to generate a position detection signal indicating a timing at which the magnet passes through a predetermined position.

16 Claims, 4 Drawing Sheets

OPTICAL UNIT

CROSS-REFERENCE TO RELATED APPLICATIONS

This application is based on and claims priority from Japanese Patent Application No. 2017-008587, filed on Jan. 20, 2017 with the Japan Patent Office, the disclosure of which is incorporated herein in its entirety by reference.

TECHNICAL FIELD

The present disclosure relates to an optical unit, and more particularly, to an optical unit for use in a vehicle lamp.

In recent years, an adaptive driving beam (ADB) technology of dynamically and adaptively controlling the light distribution pattern of a high beam based on the surrounding environment of a vehicle has been proposed. The ADB technology reduces glare imparted to a vehicle or a pedestrian by, for example, detecting the presence of a preceding vehicle, an oncoming vehicle, or a pedestrian ahead of the vehicle, and diminishing light in the area corresponding to the vehicle or the pedestrian.

The present applicant has proposed a blade scan method as an ADB method capable of solving these problems. The blade scan method is a method of forming a desired light distribution pattern in front of a vehicle by introducing light into a rotary reflector (blade) such that the introduced light is reflected at an angle depending on the rotational position of the reflector, and changing the On/Off or the quantity of light of a light source depending on the rotational position of the reflector while scanning the reflected light from the front of the vehicle.

In addition, in order to form the desired light distribution pattern, it is necessary to control the quantity of the introduced light depending on the rotational position of the reflector, and as a result, it is necessary to detect the rotational position of the reflector. For example, there has been known a technology in which a photo sensor is provided on the back side of a reflector provided with a slit, thereby detecting that the slit has passed over the photo sensor (see, e.g., International Publication No. WO 2016/104319).

Meanwhile, a lamp having a lamp deflection angle controller for follow-up variation in the irradiation direction of lamp light has also been devised. In this lamp, a motor is provided so as to deflect the lamp, and the motor has a Hall element as a rotational position detector that detects the rotational position of the motor (see, e.g., Japanese Patent Laid-Open Publication No. 2002-326535).

SUMMARY

In the above-described method of detecting the rotational position of the reflector using the photo sensor, it is necessary to provide a photo sensor and a light-emitting unit for position detection with a reflector interposed therebetween. As a result, an extra space in which the respective components are installed is required. Meanwhile, although it is possible to detect the position of a rotor of the motor using the Hall element provided in the motor, restrictions may be imposed on the configuration of the motor or the reflector in some cases.

The present disclosure has been made in view of these circumstances, and an object of the present disclosure is to provide a new configuration that detects the rotational position of a rotary reflector.

In order to achieve the object, in accordance with an aspect of the present disclosure, an optical unit includes a rotary reflector configured to form a light distribution pattern by reflecting light emitted from a light source and scanning the reflected light, a rotation drive unit configured to rotate the rotary reflector, a magnet attached to a predetermined reference portion of the rotary reflector, and a detection unit configured to generate a position detection signal indicating a timing at which the magnet passes through a predetermined position.

According to this aspect, the position detection signal may be generated using the magnet attached to the rotary reflector. Therefore, unlike the case where a position detection signal is generated using a magnet provided in a motor, providing the detection unit may not be restricted so much by the configuration of the magnet provided in the motor and the configuration of the rotary reflector.

The rotary reflector may be provided with a plurality of blades around a rotation axis, a slit or a connection portion may be formed between the adjacent blades, and the magnet may be attached to a predetermined reference position in the vicinity of the slit. With this configuration, a position detection signal may be generated, indicating a timing at which the slit passes through a predetermined position.

The magnet may be attached to a side opposite to a reflecting surface of the rotary reflector. With this configuration, the magnet does not block the light when the light emitted from the light source is reflected by the reflecting surface of the rotary reflector.

The rotation drive unit may be a brushless motor. With this configuration, the start-up of the optical unit within a short time or the reduction of a cogging torque is enabled.

The detection unit may be disposed in an area between a rotor of the brushless motor and the rotary reflector. With this configuration, the detection unit may be brought closer to the magnet attached to the rotary reflector.

In addition, arbitrary combinations of the above components and changes between, for example, the method, apparatus, and system in the expression of the present disclosure are effective as an aspect of the present disclosure. In addition, appropriate combinations of the above-described respective elements may also be included in the scope of the present disclosure that requires patent protection by the present patent application.

According to the present disclosure, a new configuration that detects the rotational position of a rotary reflector may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
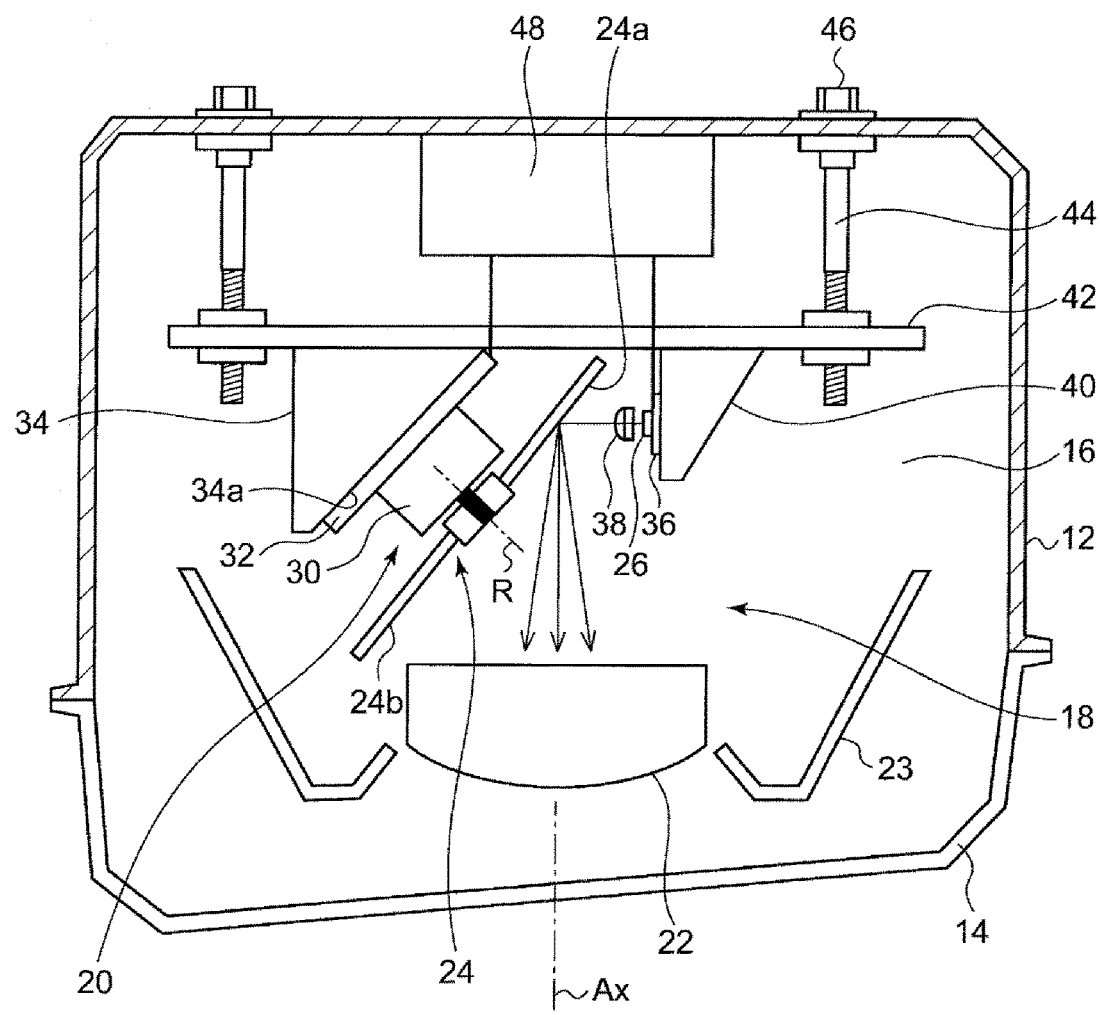
FIG. 1 is a horizontal cross-sectional view of a vehicle headlamp.

Hereinafter, the present disclosure will be described based on exemplary embodiments with reference to the accompanying drawings. The same reference numerals will be given to the same or equivalent components, members, and processings illustrated in the respective drawings, and a redundant description will be appropriately omitted. In addition, the exemplary embodiments do not limit the present disclosure, but are given by way of example, and all features described in the exemplary embodiments or combinations thereof are not necessarily essential to the present disclosure.

An optical unit of the present disclosure may be used in various vehicle lamps. Hereinafter, a case where the optical unit of the present disclosure is applied to a vehicle headlamp among vehicle lamps will be described.

[Vehicle Headlamp]

First, the outline of a vehicle headlamp in which the optical unit according to the present exemplary embodiment may be mounted will be described. FIG. 1 is a horizontal cross-sectional view of a vehicle headlamp. The vehicle headlamp 10 illustrated in FIG. 1 is a left headlamp mounted on the left side of the front end portion of a vehicle and has the same structure as a right headlamp mounted on the right side, except that the left headlamp is bilaterally symmetrical with the right headlamp. Therefore, in the following description, the left vehicle headlamp 10 will be described in detail, and a description of the right vehicle headlamp will be omitted.

As illustrated in FIG. 1, the vehicle headlamp 10 includes a lamp body 12 having a recess that is opened forward. The lamp body 12 is covered with a front cover 14, the opening in the front side of which is transparent, so that a lamp chamber 16 is defined therein. The lamp chamber 16 functions as a space in which a lamp unit 18 is accommodated.

The lamp unit 18 is a unit that adopts the ADB technology of a blade scan method and is configured to radiate a so-called variable high beam. The lamp unit 18 includes an optical unit 20 and a projection lens 22. The optical unit 20 includes a rotary reflector 24 and a light source 26. For example, a convex lens is used as the projection lens 22. Although the shape of the convex lens may be appropriately selected according to light distribution characteristics such as, for example, a required light distribution pattern or an illuminance distribution, an aspheric lens or a free-form surface lens is used. In addition, an extension reflector 23 is provided around the projection lens 22.

The rotary reflector 24 is configured to form a light distribution pattern by reflecting light emitted from the light source 26 and scanning the reflected light while being rotated in one direction about a rotation axis R by a motor 30 that is a drive source. In addition, the rotary reflector 24 includes an annular reflection area 24a, which is configured to form a desired light distribution pattern by reflecting the light emitted from the light source 26 while being rotated.

The On/Off of the light source 26 may be controlled within a short time, and for example, a semiconductor light-emitting element such as, for example, a light-emitting diode (LED), a laser diode (LD), or an electroluminescence (EL) element is suitable as the light source 26.

The motor 30 is mounted on a substrate 32. The substrate 32 is mounted on and fixed to a mounting surface 34a of a heat sink 34. The mounting surface 34a is configured such that the rotation axis R of the rotary reflector 24 is inclined with respect to the optical axis Ax or the front direction of the vehicle in a state where the substrate 32 is mounted thereon.

The light source 26 is mounted on a substrate 36. In addition, a lens 38 serving as a primary optical system is provided between the rotary reflector 24 and the light source 26 in the light emitting direction of the light source 26. The lens 38 condenses the light emitted from the light source 26 so that the light emitted from the light source 26 is directed toward the reflection area 24a of the rotary reflector 24. The substrate 36 is mounted on the heat sink 40. The heat sink 34 and the heat sink 40 are fixed to a metal plate-shaped support member 42. In addition, the lamp unit 18 is supported by the support member 42 so as to be tiltable with respect to the lamp body 12 by a device that uses an aiming screw 44 and a nut 46.

A control circuit 48 is connected, via respective boards, to the light source 26 and the motor 30 described above, and performs transmission of a signal for the control of the light source 26 or the motor 30 and reception of signals detected by a detection unit to be described later.

Figure 2:
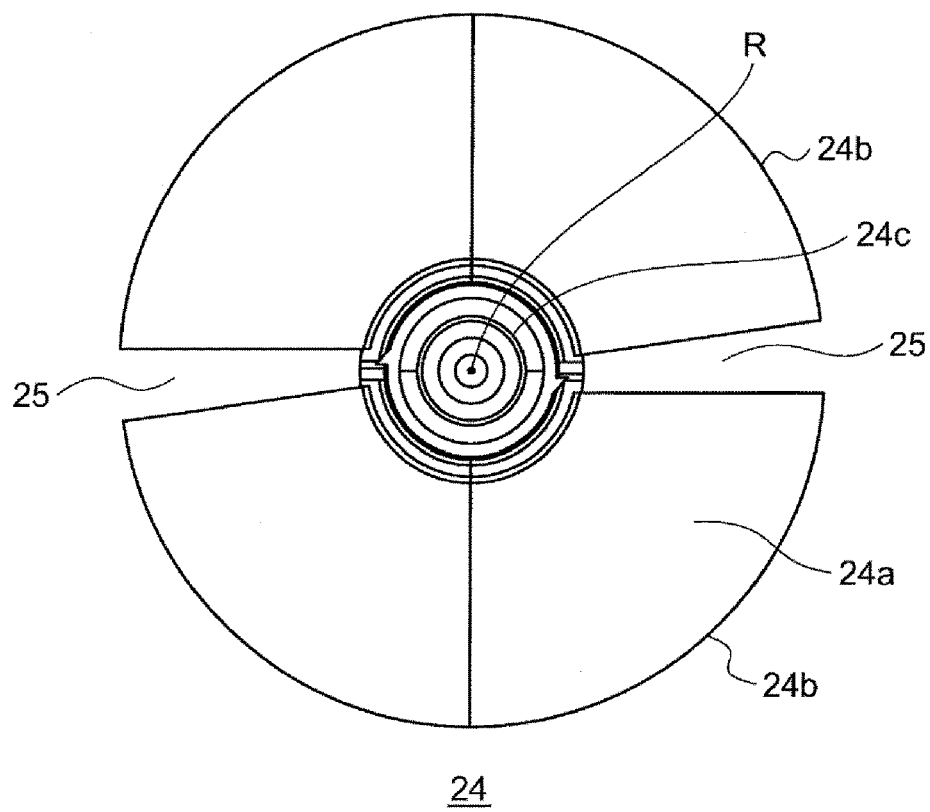
FIG. 2 is a front view of a rotary reflector.
Figure 3:
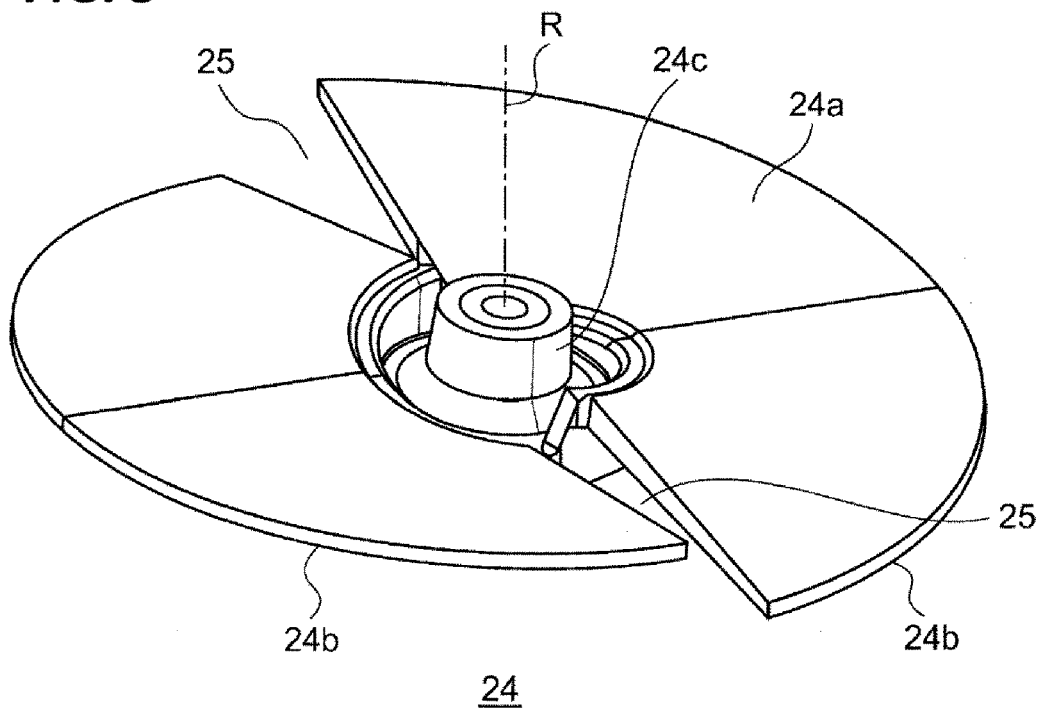
FIG. 3 is a perspective view of the rotary reflector.

FIG. 2 is a front view of the rotary reflector 24, and FIG. 3 is a perspective view of the rotary reflector 24.

The rotary reflector 24 is provided with two blades 24b, which have the same shape and serve as a reflecting surface, around a cylindrical rotating portion 24c. Slits 25 are formed between the adjacent blades. The rotation axis R of the rotary reflector 24 is inclined with respect to the optical axis Ax as described above, and is provided in a plane including the optical axis Ax and the light source 26. In other words, the rotation axis R is provided substantially parallel to the scan plane of the light (irradiation beam) of the light source 26 that is scanned in the left and right direction by rotation. This enables the thickness of the optical unit to be reduced. Here, the scan plane may be regarded as a fan-shaped plane that is defined by continuously connecting the track of light of the light source 26 as scan light, for example.

In addition, the shape of each blade 24b of the rotary reflector 24 is configured so that a secondary light source of the light source 26 is formed in the vicinity of the focal point of the projection lens 22 by reflection. In addition, the blade 24b has a twisted shape so that the angle between the optical axis Ax and the reflecting surface changes in the circumferential direction about the rotation axis R. This enables scanning using the light (light source image) of the light source 26.

(Optical Unit)

Figure 4:
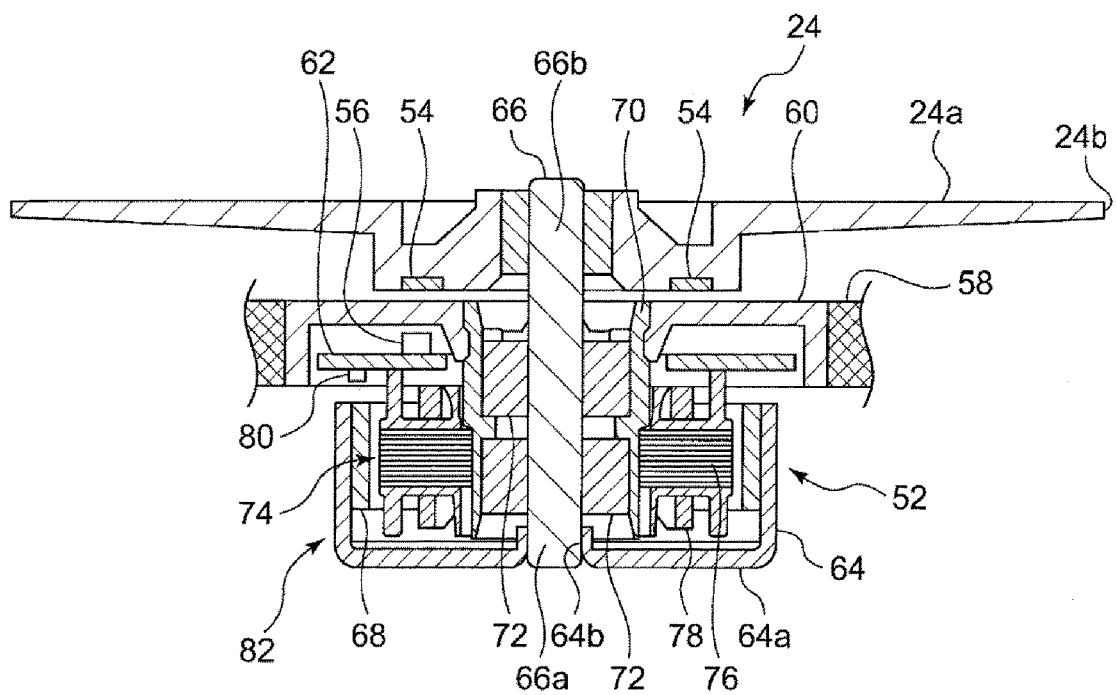
FIG. 4 is a cross-sectional view of an optical unit according to the present exemplary embodiment.
Figure 5:
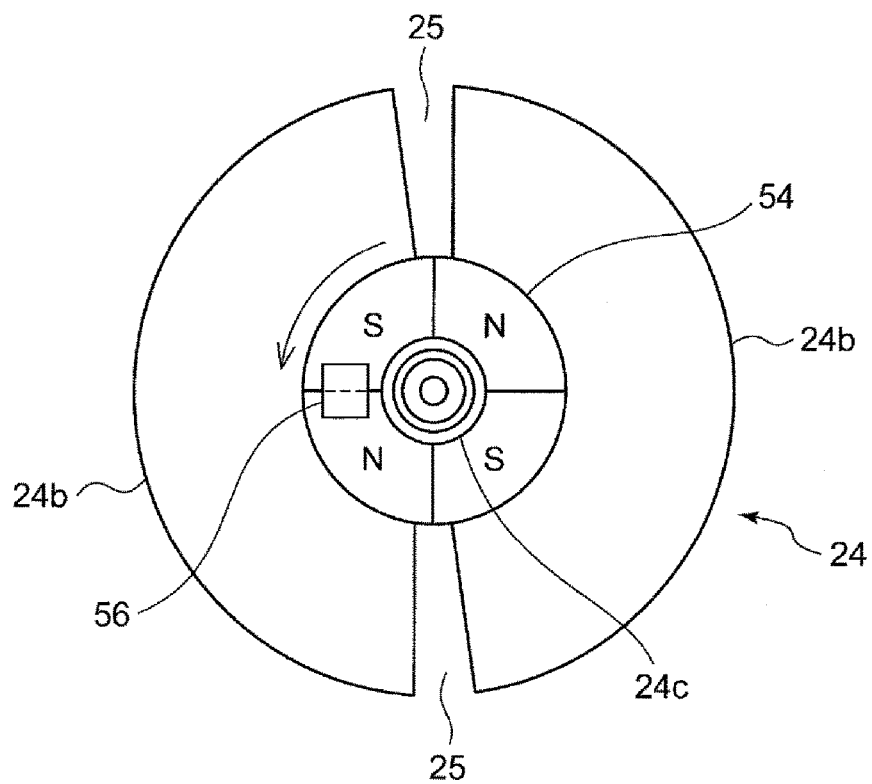
FIG. 5 is a view for explaining a positional relationship between a magnet and a detection unit according to the present exemplary embodiment.

FIG. 4 is a cross-sectional view of the optical unit according to the present exemplary embodiment. FIG. 5 is a view for explaining a positional relationship between a magnet and a detection unit according to the present exemplary embodiment. An optical unit 50 illustrated in FIG. 4 corresponds to the optical unit 20 illustrated in FIG. 1, and the same reference numerals will be given to the same components as those of the optical unit 20, and a redundant description thereof will be appropriately omitted. In addition, FIG. 5 illustrates the rotary reflector 24 when viewed from the back side (the side opposite to the reflection area 24a).

The optical unit 50 includes the rotary reflector 24 configured to form a light distribution pattern by reflecting the light emitted from the light source 26 and scanning the reflected light, a motor 52 as a rotation drive unit to rotate the rotary reflector 24, a disk-shaped magnet 54 attached to a predetermined reference portion of the rotary reflector 24, and a Hall element 56 serving as a detection unit to generate a position detection signal that indicates the timing at which the magnet 54 passes through a predetermined position.

The motor 52 according to the present exemplary embodiment is a three-phase brushless motor. The motor 52 includes a case 60 fixed to a fixing member 58, which is provided in the lamp chamber 16 of the vehicle headlamp 10, a printed circuit board 62 disposed inside the case 60, a cylindrical yoke 64, and a rotating shaft 66 having one end portion 66a fixed to an opening 64b, which is formed in the center of a bottom portion 64a of the yoke 64. The rotary reflector 24 is fixed to the other end portion 66b of the rotating shaft 66.

A single cylindrical rotor magnet 68 (or a plurality of arc-shaped rotor magnets) is fixed on the inner wall of the yoke 64. A cylindrical hollow boss 70 is fixed to the center of the case 60. The hollow boss 70 rotatably supports the rotating shaft 66 via a bearing 72. An annular stator coil 74 is fixed to the outer periphery of the hollow boss 70. The stator coil 74 includes a core 76 formed in a petal shape having a plurality of radial arms, and a coil 78 wound around each radial arm. Each terminal of the coil 78 is electrically connected to the printed circuit board 62, and three-phase current (direct current or alternating current) is supplied to the stator coil 74 through the printed circuit board 62.

A plurality of Hall elements 80, which is arranged at a required interval in the circumferential direction of a rotor 82, is disposed on and supported by one surface of the printed circuit board 62. In addition, when the rotor magnet 68 rotates simultaneously with the rotor 82, the magnetic field in each Hall element 80 is changed, causing each Hall element to be switched between the On-state and the Off-state, whereby a pulse signal corresponding to the rotation period of the rotor 82 is output.

In addition, the Hall element 56 is disposed on the other surface of the printed circuit board 62. The Hall element 56 generates a position detection signal that indicates the timing at which the gap between magnetic poles (the area in which the direction of the magnetic flux is changed) of the magnet 54 fixed to the back side of the rotary reflector 24 passes through a predetermined position (e.g., the upper surface of the Hall element 56).

As a result, the position detection signal may be generated using the magnet 54 attached to the rotary reflector 24. Therefore, unlike a case where a position detection signal is generated using the rotor magnet 68 of the motor 52, providing the Hall element 56 may not be restricted so much by the number of magnetic poles of the rotor magnet 68 of the motor 52 and the number of blades of the rotary reflector 24 (the number of slits).

Here, the predetermined reference portion of the rotary reflector 24 may be any location as long as the detection unit can generate a position detection signal capable of specifying the rotational position of the rotary reflector 24 when a magnet is attached thereto. Thus, the reference portion may be not only a characteristic location such as the vicinity of the slits 25 of the rotary reflector 24 or the vicinity of the rotating portion 24c of the blades 24b, but also a location slightly spaced apart from the central area of the blades 24b or the slits 25. In this case, the On/Off of the light source 26 may be controlled by adding the adjustment time, which is obtained from a positional relationship between the reference portion to which the magnetic poles of the magnet are attached and a characteristic location such as, for example, the slits 25 or the rotation speed of the rotary reflector 24, to the timing at which the position detection signal is generated.

In the rotary reflector 24 according to the present exemplary embodiment, the plurality of blades 24b is provided around the rotating portion 24c and the slits 25 are formed between the adjacent blades 24b. The magnet 54 is attached to the rotary reflector 24 so that the area between the magnetic poles is located in the vicinity of the rotating portion 24c in the slits 25. As a result, the position detection signal, which indicates the timing at which the slits 25 pass through the predetermined position, may be generated. In addition, the adjacent blades 24b may be connected to each other by a connecting portion, and the area between the magnetic poles of the magnet may be located on the connecting portion.

The magnet 54 according to the present exemplary embodiment is attached to the side opposite to the reflection area 24a of the rotary reflector 24. As a result, when the light emitted from the light source 26 is reflected by the reflection area 24a of the rotary reflector 24, the magnet 54 does not block the light. In addition, since the annular magnet 54 has a highly symmetrical shape, the deviation of the center of gravity is suppressed when the magnet 54 is attached to the rotary reflector 24, and vibration or eccentricity is suppressed when the rotary reflector 24 is rotated at a high speed (e.g., 1000 rpm to 2000 rpm).

As the motor 52 according to the present exemplary embodiment, a three-phase brushless motor is suitable. Therefore, it is possible to start up the optical unit 50 within a short time or to reduce a cogging torque.

The Hall element 56 according to the present exemplary embodiment is disposed in the area between the rotor 82 of the motor 52 and the rotary reflector 24. Thereby, the Hall element 56 may be brought closer to the magnet 54 attached to the rotary reflector 24.

(Modification)

Figure 6:
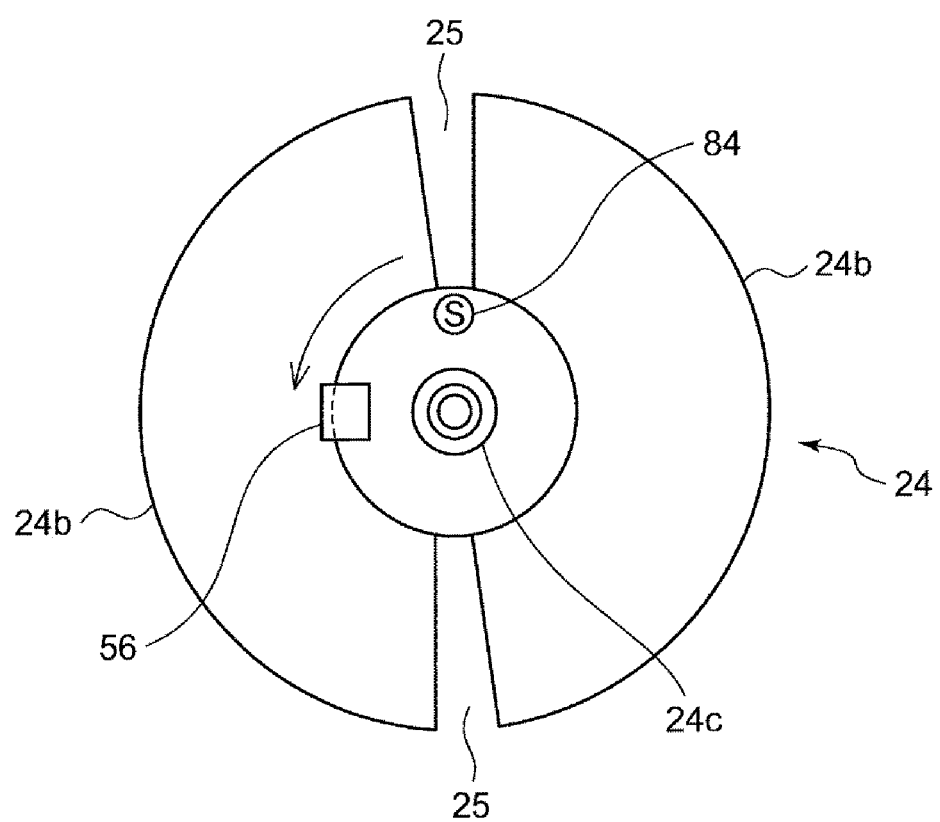
FIG. 6 is a view for explaining a positional relationship between the magnet and the detection unit according to a modification of the present exemplary embodiment.

FIG. 6 is a view for explaining a positional relationship between the magnet and the detection unit according to a modification of the present exemplary embodiment. A magnet 84 illustrated in FIG. 6 is a two-pole magnet, the front and back surfaces of which have an N-pole and an S-pole, respectively. In addition, the magnet 84 is disposed in the vicinity of the rotating portion 24c in the slit 25 on one side. The Hall element 56 generates a position detection signal that indicates the timing at which magnetic poles (the area in which the magnitude of the magnetic flux becomes the peak) of the magnet 84 fixed to the back side of the rotary reflector 24 pass through a predetermined position (e.g., the upper surface of the Hall element 56).

As described above, the Hall element 56, which generates the position detection signal of the rotary reflector 24, is provided separately from the Hall element 80, which detects the position of the rotor magnet 68 of the rotor 82, whereby position detection depending on the configuration of the rotary reflector 24 may be realized without restriction in the configuration of the motor 52.

In addition, by attaching a position detection magnet to a predetermined area of the rotary reflector 24, even if an error occurs in the assembly of the rotary reflector 24 and the rotating shaft 66 of the motor 52, it has no direct effect on a relationship between the detection timing of the position detection signal and the position of the slit. Therefore, when the rotating portion 24c of the rotary reflector 24 is press-fitted into the rotating shaft 66, it may be assembled without considering the rotational position of the rotary reflector 24. As a result, it is possible to manufacture the optical unit by a simple process of merely press-fitting the rotary reflector 24 into the rotating shaft 66 at an arbitrary rotational position.

Although the present disclosure has been described above with reference to the above-described exemplary embodiments, the present disclosure is not limited to the above-described exemplary embodiment, and appropriate combinations or substitutions of the configurations of the exemplary embodiments are included within the present disclosure. In addition, it is also possible to appropriately rearrange the order of arrangement or processings in the exemplary embodiments based on the knowledge of a person skilled in the art, or to add modifications such as, for example, various design changes to the exemplary embodiments, and the exemplary embodiments to which the modifications are added may also be included within the scope of the present disclosure.

For example, in the above-described optical unit, the slits may not be necessarily provided between the blades. In connection with the number of blades in the rotary reflector, a single helical blade may be provided. In addition, three or more blades may be provided.

What is claimed is:

1. An optical unit comprising:
    a rotary reflector including a plurality of blades disposed around a rotation axis thereof and configured to form a light distribution pattern by reflecting light emitted from a light source and scanning the reflected light;
    a rotation driver configured to rotate the rotary reflector;
    a magnet attached to a predetermined portion of the rotary reflector and configured to rotate with the plurality of blades of the rotary reflector; and
    a position detector configured to detect a rotational position of the magnet of the rotary reflector in order to generate a position detection signal of the rotary reflector indicating a timing at which the magnet passes through a predetermined position.

2. The optical unit of claim 1, wherein a slit or a connection portion is formed between adjacent blades, and
    the magnet is attached to a predetermined position in a vicinity of the slit.

3. The optical unit of claim 2, wherein the magnet is attached to a side opposite to a reflecting surface of the rotary reflector.

4. The optical unit of claim 3, wherein the rotation driver is a brushless motor.

5. The optical unit of claim 4, wherein the position detector is disposed in an area between a rotor of the brushless motor and the rotary reflector.

6. The optical unit of claim 2, wherein the rotation driver is a brushless motor.

7. The optical unit of claim 6, wherein the position detector is disposed in an area between a rotor of the brushless motor and the rotary reflector.

8. The optical unit of claim 1, wherein the magnet is attached to a side opposite to a reflecting surface of the rotary reflector.

9. The optical unit of claim 8, wherein the rotation driver is a brushless motor.

10. The optical unit of claim 9, wherein the position detector is disposed in an area between a rotor of the brushless motor and the rotary reflector.

11. The optical unit of claim 1, wherein the rotation driver is a brushless motor.

12. The optical unit of claim 11, wherein the position detector is disposed in an area between a rotor of the brushless motor and the rotary reflector.

13. The optical unit of claim 1, wherein each of the plurality of blades has a twisted shape so that an angle between an optical axis of the optical unit and the reflecting surface changes in a circumferential direction about a rotation axis of the rotary reflector.

14. The optical unit of claim 1, wherein a rotation axis of the rotary reflector is inclined with respect to an optical axis of the optical unit, and is provided in a plane including the optical axis and the light source.

15. The optical unit of claim 14, wherein the rotation axis of the rotary reflector is provided substantially parallel to a scan plane of the light of the light source that is scanned in left and right directions by rotation.

16. The optical unit of claim 1, wherein the position detector is a Hall element.

* * * * *